C. H. PARSHALL,
Assignor, by mesne assignments, to DETROIT LUBRICATOR MANUFACTURING CO.
Lubricator.
No. 9,601. Reissued March 8, 1881.
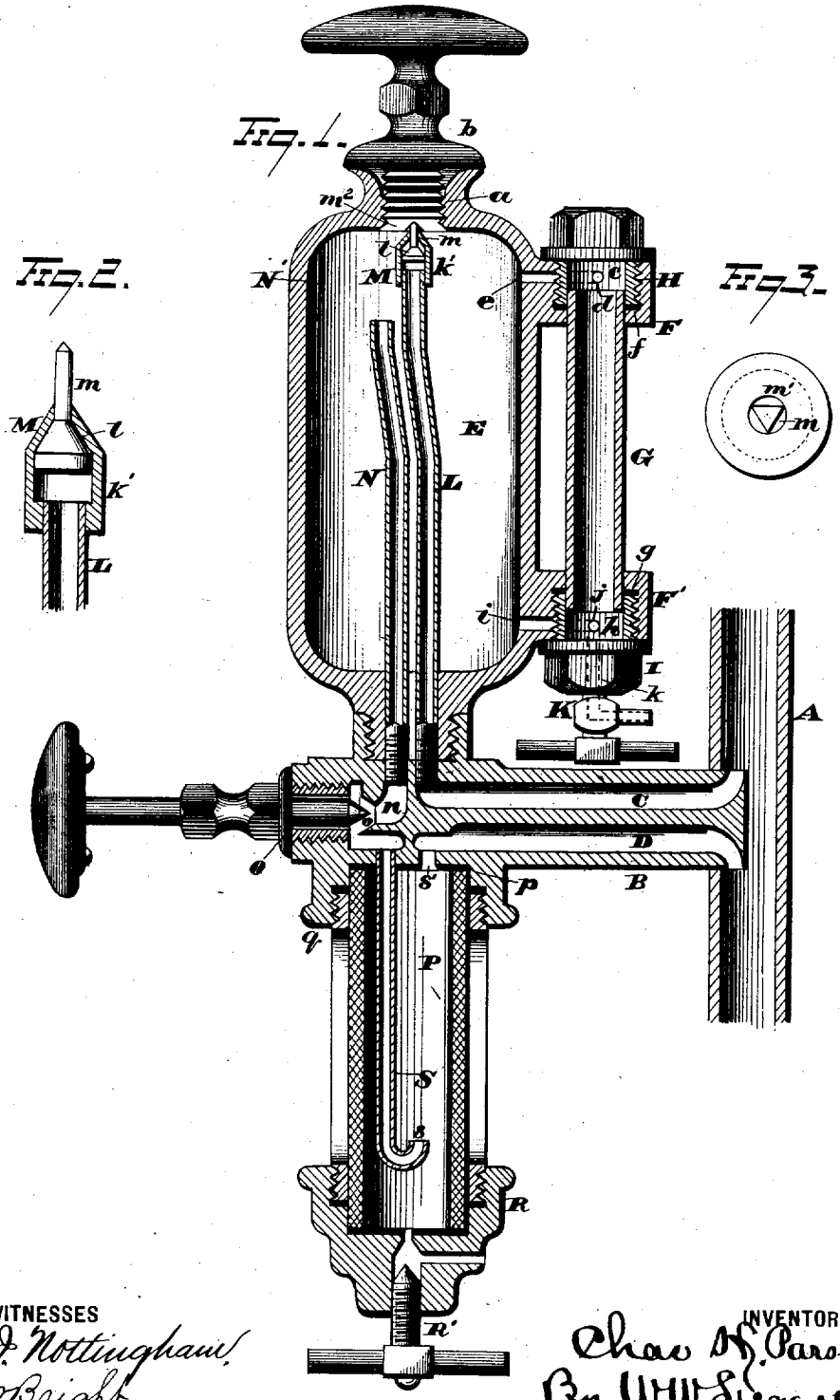
WITNESSES
E. J. Nottingham
A. M. Bright
INVENTOR
Chas H. Parshall
By W. W. Leggett.
ATTORNEY
N. PETERS, PHOTO-LITHOGRAPHER, WASHINGTON, D. C.

UNITED STATES PATENT OFFICE.

CHARLES H. PARSHALL, OF DETROIT, MICHIGAN, ASSIGNOR, BY MESNE ASSIGNMENTS, TO DETROIT LUBRICATOR MANUFACTURING COMPANY, OF SAME PLACE.

LUBRICATOR.

SPECIFICATION forming part of Reissued Letters Patent No. 9,601, dated March 8, 1881.

Original No. 213,589, dated March 25, 1879. Application for reissue filed October 20, 1879.

*To all whom it may concern:*

Be it known that I, CHARLES H. PARSHALL, of Detroit, in the county of Wayne and State of Michigan, have invented certain new and useful Improvements in Lubricators; and I do hereby declare the following to be a full, clear, and exact description of the invention, such as will enable others skilled in the art to which it pertains to make and use it, reference being had to the accompanying drawings, which form a part of this specification.

My invention relates to an improvement in lubricators.

Heretofore, in lubricators wherein the oil is fed automatically by the superior gravity of water of condensation, the oil is displaced and moved to the oil-eduction outlet of the lubricator by the superior weight or gravity of the condense-water, the latter entering the oil-receptacle and displacing a corresponding quantity of oil, and causing the latter to be expelled from the oil-receptacle and fed to any desired point.

The object of my invention is to provide a lubricator of such construction that the oil may be fed by its superior gravity, due to a sufficient head of oil-supply to cause the oil to flow upwardly through a column of water to the point of discharge; and to this end my invention consists, first, in combining, in a lubricator, a chamber or tube of glass for containing water with an outlet communicating with the parts to be lubricated, and an oil-conduit opening into the said chamber below the water-level through which oil is forced and caused to rise in visible quantities through the water, thus indicating the rate at which the oil is being fed to the parts to be lubricated; also, in combining with the foregoing an oil-reservoir located at a higher level than the foregoing, so that oil passed through the conduit will form a column of greater weight than the reacting column of water in the water-chamber, whereby the oil, by the preponderating weight of its column, shall be forced from the conduit into the water, and thence rise through the water by its gravity; also, in combining in a lubricator an oil-reservoir communicating with the steam-pressure of the boiler, a water tube or chamber, also communicating with the pressure in the boiler, and an oil-conduit leading from the oil-reservoir and discharging beneath the water-level in the water-chamber, so as in use to form a column of oil which shall exceed the resistance of the column of water in the water-chamber, so that the oil shall be discharged into the water by the action of gravity and rise through the water by its own gravity; also, in so combining the oil-conduit with the water-chamber that the oil shall be discharged into the chamber at a point free from the sides of the chamber, so that it shall rise unimpeded through the water; also, in other features of the construction, as will hereinafter be described, and pointed out in the claims.

In the accompanying drawings, Figure 1 is a vertical section of my improved lubricator. Fig. 2 is a detached view of the steam-pipe and check-valve located therein, and Fig. 3 is a transverse view of the stem of the check-valve.

A represents the steam-pipe to which the lubricator is to be attached.

B is the stem of the lubricator, and is provided with independent passages C and D.

To the upper side of the stem B is secured an oil-reservoir, E, which is preferably made of metal, although it may be constructed of any desired material. The upper end of the oil-reservoir E is furnished with an oil-induction opening, *a*, through which oil is supplied to the reservoir, said opening *a* being closed by a screw-threaded stopper, *b*, after the reservoir has been filled.

Cups F F′ are cast solid with the reservoir E, and are located near opposite ends of the same, and receive the opposite ends of the glass indicating-tube G therein.

H is a screw-threaded plug provided with an interior chamber, *c*, and a passage, *d*, formed through the chambered portion of the same. Passage *d* connects with a passage, *e*, communicating with the interior of the oil-reservoir.

Packing ring or gasket *f* is fitted around the upper end of the tube G, and when the lower end of the screw-threaded plug H is turned down snugly upon the packing-ring a tight joint is formed between the glass tube and its supporting-cup, while a free passage is formed through the plug, establishing a direct communication between the oil-reservoir and upper end of the glass tube G. The lower end of tube G extends through the bottom of supporting cup or flange F′, and is retained in place by the screw-threaded plug I, the end of which rests upon a packing-ring, *g*, surrounding tube G. Plug I is provided with an opening, *h*, which connects with a passage, *i*, leading to the interior and lower portion of the oil-reservoir.

A waste-cock, K, is secured to the lower end of plug I, and connects with the inner chamber, *j*, of said plug by means of a passage, *k*, formed therein. By opening the waste-cock the oil and water in reservoir E may be drawn off when desired.

L is a steam-tube, the lower end of which is screwed into the stem B of the lubricator, and connects with the steam-passage C. The upper end of steam-tube L extends nearly to the top of the oil-reservoir, and is provided with a valve-chamber, *k′*, which is furnished with a conical valve-seat, *l*. Within valve-chamber *k′* is located an upwardly-closing conical valve, M, having a stem, *m*, which projects through the opening *m′* in the upper end of the valve-chamber, and which serves to guide the valve to its seat. As the steam enters the passage C and flows into the steam-tube L, the force of the steam, acting against the face of the conical valve, raises the latter snugly against its seat, thereby preventing the escape of steam into the oil-reservoir E.

The following provision is made to admit steam into the oil-reservoir for the purpose of forming condense-water to feed the oil to the point to be lubricated. The lower end of the screw-threaded stopper *b* is recessed at $m^2$ for the reception of the upper end of the valve-stem. In Fig. 3 is illustrated the form of valve-stem *m* in cross-section, it being triangular or of any equivalent form, so that while the valve is guided steam is allowed to flow past the stem into the oil-reservoir. When it is desired to admit steam into the oil-reservoir, by simply turning the screw-stopper *b* downward, the valve is forced away from its seat, and steam rushes past the valve and through the steam-passages on the sides of the valve-stem into the oil-reservoir. The amount of steam-opening may be regulated with the greatest accuracy, so that any desired amount of steam may be supplied to the oil-reservoir, the adjustment being effected by varying the height of the lower end of screw-stopper *b*.

N represents an oil-tube, which extends upwardly into the oil-reservoir, the upper end of tube N being below the upper end of the steam-supply tube, whereby there is formed a condensing-chamber, N′, above the top of the oil-supply tube. The lower end of the oil-supply tube N is screwed into the stem B of the lubricator, and communicates with an independent passage, *n*, formed therein.

O is an oil-regulating valve, which is arranged to fit the conical seat *o*, formed in the passage *n*, and by means of which the quantity of oil fed from the oil-tube can be regulated.

To the under side of stem B is secured a glass or transparent cylinder, P, the upper end seating against a packing-ring, *p*.

Surrounding the glass cylinder P is an open-work shield, Q, the upper end of which is screw-threaded and constructed to be screwed into the screw-threaded nipple or socket *q*, formed on the stem B.

To the lower end of the shield Q is attached a cup-shaped nut, R, within which is received the lower end of the glass cylinder or tube P. Nut R is provided with a waste-cock, R′, for the purpose of draining the water from the glass cylinder when desired.

S is an inverted siphon-tube, the upper end being secured to the stem B of the lubricator, and the lower being upturned at *s*, to direct the flow of the oil upward. The glass cylinder P communicates with the oil-passage D in the stem B by the port *s′*.

Having fully described the construction of my improved lubricator, I will now proceed to explain its operation.

The oil-reservoir is first filled with oil or any suitable lubricant. The stopper attached to the top of the oil-reservoir is then screwed down a sufficient distance to open the check-valve in the upper end of the steam-inlet pipe, and allow steam to flow from the steam-pipe A through the steam-passage C into the steam-pipe in the oil-reservoir. As the steam issues from the upper end of the steam-pipe into the oil-reservoir the steam is condensed, and by reason of its superior gravity the condense-water settles to the bottom of the oil-reservoir, thereby displacing an equal quantity of the oil therein contained. This operation raises the oil in the reservoir, and causes it to enter and fill the oil-feeding tube in the oil-reservoir. Steam also enters the glass cylinder P through passage D and port *s′*, and condenses and fills said tube or cylinder with water. By opening the oil-regulating valve oil descends from the oil-tube in the reservoir, flows through the oil-passage in the stem B, past the valve, and into the inverted siphon-tube in the glass cylinder. As the column of oil is equal to the distance from the top of the oil-feeding tube in the oil-reservoir to the lower end of the inverted tube in the glass cylinder, the weight of oil in said column is greater than the column of water in the glass cylinder, and hence the oil is expelled from the lower end of the siphon-tube, and is floated to the top of the glass cylinder, and passes into the steam-pipe through port *s′* and passage D.

The amount of oil passing from the lubricator can be readily ascertained by inspecting the glass cylinder P, as drops of oil are continually ascending therein on their passage to the point to be lubricated. The quantity of oil in the oil-reservoir can be readily ascertained from the glass indicating-tube connected therewith, the oil standing at the same height therein that it does in the oil-reservoir.

From the foregoing it will be observed that my improvement is a radical departure from all other lubricators heretofore produced, in that the oil is fed to the point to be lubricated by the superior gravity of a column of oil over a column of water, through which the oil is passed, and by means of which the extent of feed is readily ascertained.

It is evident that many slight changes in the construction and relative arrangement of parts may be devised for accomplishing the same result without departing from the spirit of my invention, and hence I do not limit myself to the exact construction shown and described, my invention contemplating, broadly, any construction in which the oil itself, on its way to the parts to be lubricated, is caused to pass in visible drops through a body of water, as counterdistinguished from lubricators in which the rate of feed of the oil is inferred by the rate at which drops of water descend through a body of oil. Where the rate of feed of the oil is observed by the rate at which drops of water descend through the oil in a transparent chamber, it is impossible to so employ it with black oil, because the oil, being black, obscures from view the drops of water passing through it; but by my device drops of black oil, or oil of any other character, are plainly visible as they rise through the water.

What I claim is—

1. In a lubricator, the combination, with an oil-chamber connecting with the boiler, a water-chamber located below the oil-chamber, and conduit connecting the water-chamber with the parts to be lubricated, of an oil-supply conduit leading from the oil-chamber downward to the lower portion of the water-chamber, the parts being constructed to cause the oil to be discharged into the lower portion of the water-chamber and be floated upwardly to the discharge-opening, substantially as set forth.

2. In a lubricator, a chamber containing water and communicating with the parts to be lubricated, a chamber containing oil, with a conduit leading to the lower portion of the water-chamber, the construction being such that the gravity of the column of oil shall exceed the reacting gravity of the column of water, thereby causing the oil to discharge into the water and rise by its own gravity through the latter on its way to the parts to be lubricated.

3. In a lubricator, a chamber containing water and communicating with the parts to be lubricated, a chamber containing oil and communicating with the boiler, and a conduit leading from the oil-chamber to the water-chamber below its water-level, the construction being such that water accumulating in the oil-chamber shall float the oil and cause the latter to pass down through the conduit, be discharged into the water-chamber by the superior weight of the column of oil, and rise through the water in visible drops by its gravity.

4. A lubricator consisting, essentially, in the combination, with an oil-reservoir provided with a steam-pipe which conveys steam into the upper end of said reservoir, and an oil-pipe the inlet-opening of which is below the outlet of the steam-pipe, whereby a condensing-chamber is formed in the upper end of the oil-reservoir, of a transparent cylinder located below the oil-reservoir and provided with an inverted siphon-pipe, which connects with the oil-pipe in the oil-reservoir, whereby a column of oil is formed to overcome the gravity of the column of water in the glass cylinder, substantially as set forth.

5. In a lubricator, the combination, with an oil-reservoir provided with a steam-pipe which conveys steam into the upper end of said reservoir, and an oil-pipe the inlet-opening of which is below the outlet-opening of the steam-pipe, whereby a condensing-chamber is formed in the upper end of the oil-reservoir, a transparent cylinder located below the oil-reservoir and provided with an inverted siphon-pipe, of an oil-supply-regulating valve arranged and adapted to govern the flow of oil from the oil-pipe in the reservoir to the siphon delivery-pipe in the transparent cylinder, substantially as set forth.

6. In a lubricator, an oil-reservoir provided with a steam-pipe having an upwardly-closing check-valve and means for regulating the extent of opening of said check-valve, and an independent oil-feeding tube, the upper end of which is below the upper end of the steam-tube, thereby forming a steam-condensing chamber in the upper parts of the oil-reservoir, above the upper end of the oil-feeding pipe, substantially as set forth.

7. The combination, with an oil-reservoir provided with independent steam and oil pipes, of a transparent cylinder located below the oil-reservoir and provided with an inverted siphon-pipe, and a valve for opening or closing communications between the oil-pipe in the reservoir and the siphon-pipe in the glass or transparent cylinder, substantially as set forth.

8. The combination, with the stem of a lubricator having independent steam-passages therein, an oil-reservoir attached to the upper side of said stem, and a tube for supplying steam to the upper end of said reservoir, of a glass cylinder connected with the lower side of the stem, and an oil-passage provided with a valve, said passage extending from the upper portion of the oil-reservoir to the lower portion of said glass cylinder, substantially as set forth.

9. In a lubricator, an oil-chamber, a transparent water-chamber located on the line of passage of the oil from the oil-chamber to the parts to be lubricated, and an oil-conduit leading from the oil-chamber and discharging into the water-chamber, the said connecting-conduit so constructed and arranged, with respect to the oil and water chambers, that the oil, after entering the conduit, is caused to take a descending course along a portion of its length, be then discharged into the water, and rise through the latter in visible quantities.

In testimony that I claim the foregoing I here sign my name in the presence of two witnesses.

CHARLES H. PARSHALL.

Witnesses:

WALTER C. BELLOWS,
WILLIAM M. PORTER.